United States Patent
Oura et al.

(10) Patent No.: US 9,503,531 B2
(45) Date of Patent: Nov. 22, 2016

(54) REGION IDENTIFICATION SERVER, REGION IDENTIFICATION METHOD, REGION IDENTIFICATION PROGRAM, AND COMPUTER READABLE RECORDING MEDIUM STORING THE PROGRAM

(75) Inventors: Takayuki Oura, Tokyo (JP); Yoshiro Hirai, Tokyo (JP); Shinsuke Nakano, Tokyo (JP)

(73) Assignee: Rakuten, Inc., Tokyo (JP)

( * ) Notice: Subject to any disclaimer, the term of this patent is extended or adjusted under 35 U.S.C. 154(b) by 621 days.

(21) Appl. No.: 13/877,081

(22) PCT Filed: Sep. 29, 2011

(86) PCT No.: PCT/JP2011/072470
§ 371 (c)(1),
(2), (4) Date: May 2, 2013

(87) PCT Pub. No.: WO2012/043768
PCT Pub. Date: Apr. 5, 2012

(65) Prior Publication Data
US 2013/0297782 A1 Nov. 7, 2013

(30) Foreign Application Priority Data

Sep. 30, 2010 (JP) .................................. 2010-221963

(51) Int. Cl.
*G06F 15/173* (2006.01)
*H04L 29/08* (2006.01)
*G06F 21/10* (2013.01)
(Continued)

(52) U.S. Cl.
CPC .............. *H04L 67/18* (2013.01); *G06F 21/10* (2013.01); *G06F 17/3087* (2013.01); *G06F 2221/2111* (2013.01); *G06F 2221/2117* (2013.01); *H04L 61/2015* (2013.01); *H04L 61/2061* (2013.01); *H04L 61/609* (2013.01); *H04W 64/00* (2013.01)

(58) Field of Classification Search
None
See application file for complete search history.

(56) References Cited

U.S. PATENT DOCUMENTS 6,823,364 B1 * 11/2004 Sollee et al. .................. 709/205
7,062,572 B1 * 6/2006 Hampton ...................... 709/245
(Continued)

FOREIGN PATENT DOCUMENTS

JP           3254422 B2   2/2002
JP         2002176444 A   6/2002
(Continued)

OTHER PUBLICATIONS

English Translation of the International Preliminary Report on Patentability issued on Apr. 18, 2013 in corresponding PCT/JP2011/072470.
(Continued)

*Primary Examiner* — Yves Dalencourt
(74) *Attorney, Agent, or Firm* — Sughrue Mion, PLLC

(57) ABSTRACT

A content server (10) includes a receiving unit (14) that receives a request signal from a request source terminal, an acquisition unit (15) that acquires an IP address assigned to the request source terminal from the request signal, and a determination unit (16) that determines a location region of a user of the request source terminal by referring to an address storage unit (11) based on the acquired IP address. The address storage unit (11) stores address information including location regions of registered users set based on addresses of the registered users and IP addresses assigned to terminals of the registered users in association with each other.

10 Claims, 11 Drawing Sheets

(51) Int. Cl.
  *H04L 29/12* (2006.01)
  *H04W 64/00* (2009.01)
  *G06F 17/30* (2006.01)

(56) References Cited

U.S. PATENT DOCUMENTS

| | | |
|---|---|---|
| 7,870,227 B2 | 1/2011 | Patel et al. |
| 2004/0083307 A1* | 4/2004 | Uysal ............... 709/246 |
| 2005/0021853 A1* | 1/2005 | Parekh et al. ........ 709/245 |
| 2005/0234922 A1* | 10/2005 | Parekh et al. ........ 707/10 |
| 2005/0251539 A1* | 11/2005 | Parekh et al. ........ 707/200 |
| 2006/0123105 A1* | 6/2006 | Parekh et al. ........ 709/223 |
| 2007/0208621 A1 | 9/2007 | Park |
| 2008/0043738 A1* | 2/2008 | Jang ............... H04L 29/12216 370/392 |
| 2009/0037602 A1* | 2/2009 | Patel et al. .......... 709/245 |
| 2010/0151816 A1* | 6/2010 | Besehanic et al. ...... 455/405 |
| 2010/0153525 A1* | 6/2010 | Parekh et al. ........ 709/221 |
| 2010/0153552 A1* | 6/2010 | Parekh et al. ........ 709/225 |
| 2011/0032870 A1* | 2/2011 | Kumar ............... 370/328 |
| 2011/0113116 A1* | 5/2011 | Burdette et al. ....... 709/217 |
| 2012/0102169 A1* | 4/2012 | Yu et al. ............ 709/223 |

FOREIGN PATENT DOCUMENTS

| | | |
|---|---|---|
| JP | 2007226789 A | 9/2007 |
| JP | 2010535390 A | 11/2010 |
| WO | 2009017942 A1 | 2/2009 |

OTHER PUBLICATIONS

Japanese Office Action issued Jan. 8, 2012 in corresponding Japanese Patent Application No. P2012-536573.
International Search Report issued Dec. 20, 2011 in corresponding PCT/JP2011/072470.

* cited by examiner

*Fig.4*

| USER ID | IP ADDRESS | LOCATION REGION | BLOCK |
|---|---|---|---|
| 0001 | xxxx.xxxx.aaaa.101 | A-ku, Sapporo-shi, Hokkaido | BLOCK A |
| 0007 | xxxx.xxxx.aaaa.102 | A-ku, Sapporo-shi, Hokkaido | |
| 0010 | xxxx.xxxx.aaaa.105 | B-ku, Sapporo-shi, Hokkaido | |
| 0012 | xxxx.xxxx.aaaa.106 | A-ku, Sapporo-shi, Hokkaido | |
| . | . | . | |
| . | . | . | |
| 0002 | xxxx.xxxx.bbbb.50 | Kawaguchi-shi, Saitama | BLOCK B |
| 0004 | xxxx.xxxx.bbbb.51 | Kawaguchi-shi, Saitama | |
| 0005 | xxxx.xxxx.bbbb.52 | Kawaguchi-shi, Saitama | |
| 0008 | xxxx.xxxx.bbbb.53 | Kawaguchi-shi, Saitama | |
| . | . | . | |
| . | . | . | |
| 0003 | xxxx.xxxx.cccc.201 | Sakai-shi, Osaka | BLOCK C |
| 0006 | xxxx.xxxx.cccc.203 | Sakai-shi, Osaka | |
| 0009 | xxxx.xxxx.cccc.204 | Sakai-shi, Osaka | |
| 0011 | xxxx.xxxx.cccc.206 | Sakai-shi, Osaka | |
| . | . | . | |
| . | . | . | . |

Fig.5

| IP ADDRESS | LOCATION REGION | BLOCK |
|---|---|---|
| xxxx.xxxx.aaaa.101 | A-ku, Sapporo-shi, Hokkaido | BLOCK A |
| xxxx.xxxx.aaaa.102 | A-ku, Sapporo-shi, Hokkaido | |
| xxxx.xxxx.aaaa.105 | B-ku, Sapporo-shi, Hokkaido | |
| xxxx.xxxx.aaaa.106 | A-ku, Sapporo-shi, Hokkaido | |
| . | . | |
| . | . | |
| xxxx.xxxx.bbbb.50 | Kawaguchi-shi, Saitama | BLOCK B |
| xxxx.xxxx.bbbb.51 | Kawaguchi-shi, Saitama | |
| xxxx.xxxx.bbbb.52 | Kawaguchi-shi, Saitama | |
| xxxx.xxxx.bbbb.53 | Kawaguchi-shi, Saitama | |
| . | . | |
| . | . | |
| xxxx.xxxx.cccc.201 | Sakai-shi, Osaka | BLOCK C |
| xxxx.xxxx.cccc.203 | Sakai-shi, Osaka | |
| xxxx.xxxx.cccc.204 | Sakai-shi, Osaka | |
| xxxx.xxxx.cccc.206 | Sakai-shi, Osaka | |
| . | . | |
| . | . | . |

*Fig.6*

| USER ID | IP ADDRESS | ADDRESS |
|---|---|---|
| 0001 | xxxx.xxxx.aaaa.101 | ...,A-ku, Sapporo-shi, Hokkaido |
| 0002 | xxxx.xxxx.bbbb.50 | ...,Kawaguchi-shi, Saitama |
| 0003 | xxxx.xxxx.cccc.201 | ...,Sakai-shi, Osaka |
| 0004 | xxxx.xxxx.bbbb.51 | ...,Kawaguchi-shi, Saitama |
| 0005 | xxxx.xxxx.bbbb.52 | ...,Kawaguchi-shi, Saitama |
| 0006 | xxxx.xxxx.cccc.203 | ...,Sakai-shi, Osaka |
| 0007 | xxxx.xxxx.aaaa.102 | ...,A-ku, Sapporo-shi, Hokkaido |
| 0008 | xxxx.xxxx.bbbb.53 | ...,Kawaguchi-shi, Saitama |
| 0009 | xxxx.xxxx.cccc.204 | ...,Sakai-shi, Osaka |
| 0010 | xxxx.xxxx.aaaa.105 | ...,B-ku, Sapporo-shi, Hokkaido |
| 0011 | xxxx.xxxx.cccc.206 | ...,Sakai-shi, Osaka |
| 0012 | xxxx.xxxx.aaaa.106 | ...,A-ku, Sapporo-shi, Hokkaido |
| . | . | . |
| . | . | . |

Fig.7

| IP ADDRESS | ADDRESS |
|---|---|
| xxxx.xxxx.aaaa.101 | ..., A-ku, Sapporo-shi, Hokkaido |
| xxxx.xxxx.bbbb.50 | ..., Kawaguchi-shi, Saitama |
| xxxx.xxxx.cccc.201 | ..., Sakai-shi, Osaka |
| xxxx.xxxx.bbbb.51 | ..., Kawaguchi-shi, Saitama |
| xxxx.xxxx.bbbb.52 | ..., Kawaguchi-shi, Saitama |
| xxxx.xxxx.cccc.203 | ..., Sakai-shi, Osaka |
| xxxx.xxxx.aaaa.102 | ..., A-ku, Sapporo-shi, Hokkaido |
| xxxx.xxxx.bbbb.53 | ..., Kawaguchi-shi, Saitama |
| xxxx.xxxx.cccc.204 | ..., Sakai-shi, Osaka |
| xxxx.xxxx.aaaa.105 | ..., B-ku, Sapporo-shi, Hokkaido |
| xxxx.xxxx.cccc.206 | ..., Sakai-shi, Osaka |
| xxxx.xxxx.aaaa.106 | ..., A-ku, Sapporo-shi, Hokkaido |
| ... | ... |
| ... | ... |

Fig.8

| REGION INFORMATION | CONTENT DATA |
|---|---|
| HOKKAIDO | CONTENT A |
| SAITAMA | CONTENT B |
| OSAKA | CONTENT C |
| . | . |
| . | . |

Fig.11

| USER ID | IP ADDRESS | LOCATION REGION | BLOCK | SUB-BLOCK |
|---|---|---|---|---|
| . | . | . | . | . |
| 0002 | xxxx.xxxx.bbbb.50 | Kawaguchi-shi, Saitama | | |
| 0004 | xxxx.xxxx.bbbb.51 | Kawaguchi-shi, Saitama | | SUB-BLOCK B1 |
| 0005 | xxxx.xxxx.bbbb.52 | Kawaguchi-shi, Saitama | BLOCK B | |
| 0008 | xxxx.xxxx.bbbb.53 | Kawaguchi-shi, Saitama | | |
| 0022 | xxxx.xxxx.bbbb.54 | Saitama-shi, Saitama | | |
| 0025 | xxxx.xxxx.bbbb.57 | Saitama-shi, Saitama | | SUB-BLOCK B2 |
| 0028 | xxxx.xxxx.bbbb.58 | Saitama-shi, Saitama | | |
| 0029 | xxxx.xxxx.bbbb.60 | Saitama-shi, Saitama | | |
| . | . | . | . | . |

REGION IDENTIFICATION SERVER, REGION IDENTIFICATION METHOD, REGION IDENTIFICATION PROGRAM, AND COMPUTER READABLE RECORDING MEDIUM STORING THE PROGRAM

This is a National Stage Entry of Application No. PCT/JP2011/072470 filed Sep. 29, 2011, claiming priority based on Japanese Patent Application No. 2010-224373 filed Sep. 30, 2010, the contents of all of which are incorporated herein by reference in their entirety.

TECHNICAL FIELD

One embodiment of the present invention relates to a region identification server, a region identification method, a region identification program, and a computer readable recording medium storing the program.

BACKGROUND ART

An IP address is assigned by a provider or the like to a user terminal That is connected to the Internet. As a technique to identify the location region of an unknown user from the IP address, Patent Literature 1 discloses a technique that identifies a region to which an access point having the IP address assigned to the user terminal belongs. Specifically, the region to which the access point belongs is identified using a database in which regions corresponding to access points and IP addresses are associated with each other.

Note that, however, in recent years, use of the Internet through a broadband connection such as optical fiber (FTTH), wireless LAN (e.g. Wi-Fi) and ADSL, not a dialup connection to an access point, has become mainstream.

CITATION LIST

Patent Literature

PTL 1: Japanese Patent No. 3254422

SUMMARY OF INVENTION

Technical Problem

In order to identify the location region of an unknown user from an IP address in such a broadband connection, it is necessary to find out which IP address is assigned by a provider to a user in which region, which is a great burden. Thus, a technique for easily identifying the location region of an unknown user is required.

Solution to Problem

A region identification server according to one embodiment of the present invention includes a receiving unit that receives a request signal from a request source terminal, an acquisition unit that acquires an IP address assigned to the request source terminal from the request signal received by the receiving unit, and a determination unit that determines a location region of a user of the request source terminal by referring to an address storage unit based on the IP address acquired by the acquisition unit, the address storage unit storing address information including location regions of registered users set based on addresses of the registered users and IP addresses assigned to terminals of the registered users in association with each other.

A region identification method according to one embodiment of the present invention is a region identification method executed by a region identification server, the method including a receiving step of receiving a request signal from a request source terminal, an acquisition step of acquiring an IP address assigned to the request source terminal from the request signal received in the receiving step, and a determination step of determining a location region of a user of the request source terminal by referring to an address storage unit based on the IP address acquired in the acquisition step, the address storage unit storing address information including location regions of registered users set based on addresses of the registered users and IP addresses assigned to terminals of the registered users in association with each other.

A region identification program according to one embodiment of the present invention causes a computer to implement a receiving unit that receives a request signal from a request source terminal, an acquisition unit that acquires an IP address assigned to the request source terminal from the request signal received by the receiving unit, and a determination unit that determines a location region of a user of the request source terminal by referring to an address storage unit based on the IP address acquired by the acquisition unit, the address storage unit storing address information including location regions of registered users set based on addresses of the registered users and IP addresses assigned to terminals of the registered users in association with each other.

A computer readable recording medium according to one embodiment of the present invention stores a region identification program causing a computer to implement a receiving unit that receives a request signal from a request source terminal, an acquisition unit that acquires an IP address assigned to the request source terminal from the request signal received by the receiving unit, and a determination unit that determines a location region of a user of the request source terminal by referring to an address storage unit based on the IP address acquired by the acquisition unit, the address storage unit storing address information including location regions of registered users set based on addresses of the registered users and IP addresses assigned to terminals of the registered users in association with each other.

According to the above embodiments, the address information in which location regions based on addresses of registered users (known users) and IP addresses of terminals of the registered users are associated with each other are prepared in advance. Then, when a request signal is transmitted from a request source terminal that requests a content, the IP address of the request source terminal is acquired from the request signal, and the location region of a user of the terminal is determined based on the IP address and the address information. In this manner, by preparing the address information using addresses of registered users and determining the location region of the user of the terminal based on the IP address of the request source terminal and the address information, it is possible to easily identify the location region of an unknown user.

In the region identification server according to another embodiment, the address information stored in the address storage unit may be arranged in ascending or descending order of IP addresses and grouped into blocks indicating specified address ranges, and, in each block, a location region with the largest number of appearances may be set as a location region of the block, and the determination unit may determine a location region corresponding to the block including the acquired IP address as the location region of the user of the request source terminal.

In this case, the address information is grouped based on the concept of blocks, and, in each block, the most frequent location region is set as the location region of the block. Then, the location region of the block where the IP address of the request source terminal is included is determined as the location region of the request user. Thus, even when a plurality of location regions exist in one block, it is possible to determine the location region of an unknown user accurately with high probability.

In the region identification server according to yet another embodiment, the address information stored in the address storage unit may be arranged in ascending or descending order of IP addresses and grouped into blocks indicating specified address ranges, in each block, a plurality of address information with the same location region and arranged consecutively may be grouped together as a sub-block, and the determination unit may determine a location region corresponding to the sub-block including the acquired IP address as the location region of the user of the request source terminal.

In this case, the address information is grouped based on the concept of blocks described above, and, in each block, a plurality of block information with the same location region and arranged consecutively are further grouped based on the concept of sub-blocks. Then, the location region of the sub-block where the IP address of the request source terminal is included is determined as the location region of the request user. It is thereby possible to determine the location region of an unknown user accurately.

In the region identification server according to yet another embodiment, the address information may be information generated based on IP addresses of terminals contained in request signals received from the terminals of the registered users and addresses of the registered users input on a web page corresponding to the request signals.

In this manner, by generating the address information from IP addresses of terminals of registered users who have accessed to a web page and addresses of the registered users that have been input on the web page, it is possible to collect a large amount of address information efficiently.

The region identification server according to yet another embodiment may further include a transmitting unit that reads content data corresponding to the location region determined by the determination unit from a content storage unit that stores region information indicating geographical regions and content data to be delivered to each region in association with each other, and transmits the read content data to the request source terminal.

In this case, the content data for the determined location region is transmitted to the request source terminal, and therefore it is possible to provide the content in accordance with the location region of an unknown user.

Advantageous Effects of Invention

According to one aspect of the present invention, by preparing address information using addresses of registered users and determining a location region of a user of a request source terminal based on an IP address of the terminal and the address information, it is possible to easily identify the location region of an unknown user.

BRIEF DESCRIPTION OF DRAWINGS

FIG. 4 is a diagram showing an example of address information according to an embodiment.

FIG. 5 is a diagram showing another example of address information according to an embodiment.

FIG. 6 is a diagram showing an example of member information used as a basis for the address information shown in FIG. 4.

FIG. 7 is a diagram showing an example of input information used as a basis for the address information shown in FIG. 5.

FIG. 8 is a diagram showing an example of content data associated with region information.

FIG. 11 is a diagram showing an example of address information according to an alternative example.

DESCRIPTION OF EMBODIMENTS

Embodiments of the present invention are described hereinafter in detail with reference to the appended drawings. In this embodiment, a region identification server according to the present invention is applied to a content server. Note that, in the description of the drawings, the same or equivalent elements are denoted by the same reference symbols, and the redundant explanation thereof is omitted.

Figure 1:
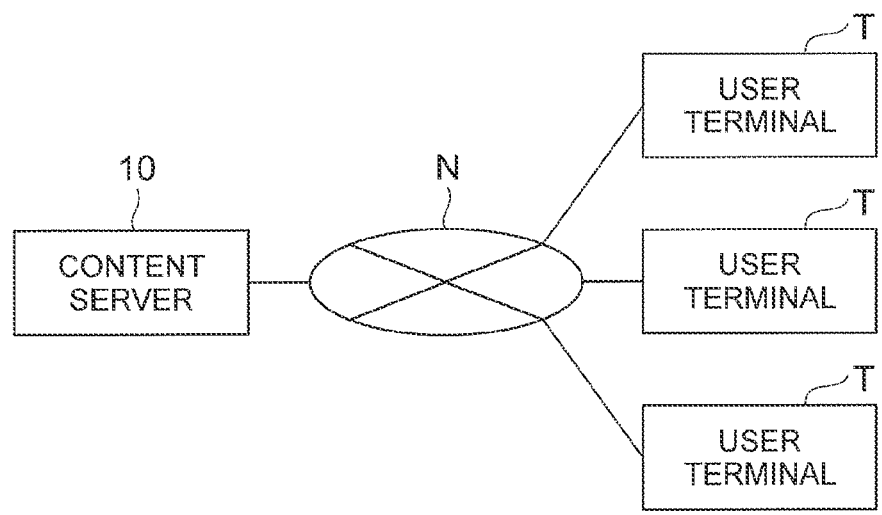
FIG. 1 is a diagram showing an overall configuration of a system including a content server according to an embodiment.

First, the functions and configuration of a content server 10 according to this embodiment are described with reference to FIGS. 1 to 8. The content server 10 is a computer system that delivers a web page to a user terminal T in response to a request signal sent from the user terminal T. As shown in FIG. 1, the content server 10 is connected to a plurality of user terminals T through a communication network N. Note that, although three user terminals T are shown in FIG. 1, any number of user terminals T may be connected. Examples of the user terminals T include personal computers, personal digital assistants (PDA), mobile phones and the like, though the variety of the terminals is not limited thereto as long as the function of receiving and displaying contents is incorporated.

Figure 2:
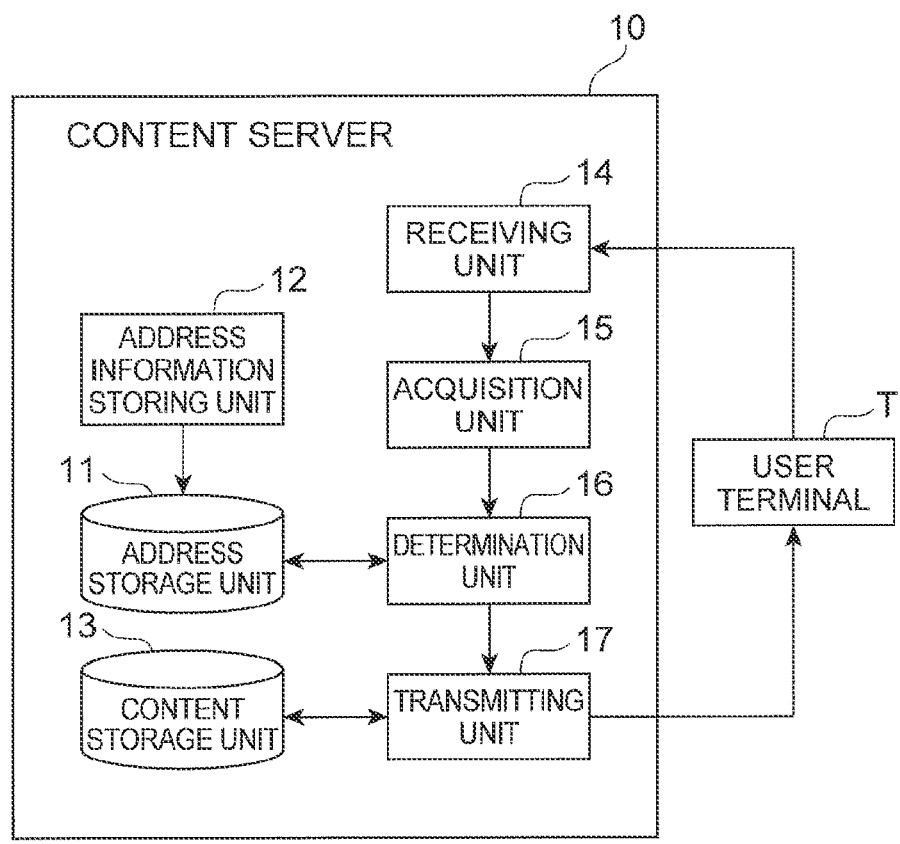
FIG. 2 is a block diagram showing a functional configuration of the content server shown in FIG. 1.

As shown in FIG. 2, the content server 10 includes, as functional components, an address storage unit 11, an address information storing unit 12, a content storage unit 13, a receiving unit 14, an acquisition unit 15, a determination unit 16, and a transmitting unit 17.

Figure 3:
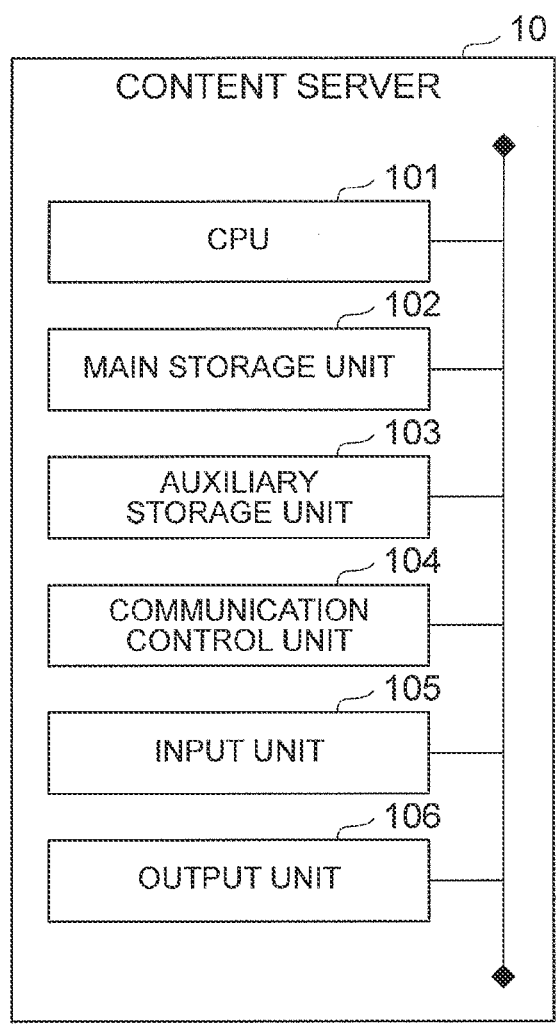
FIG. 3 is a diagram showing a hardware configuration of the content server shown in FIG. 1.

As shown in FIG. 3, the content server 10 is composed of a CPU 101 that executes an operating system, an application program and the like, a main storage unit 102 such as ROM and RAM, an auxiliary storage unit 103 such as a hard disk, a communication control unit 104 such as a network card, an input unit 105 such as a keyboard and a mouse, and an output unit 106 such as a monitor. The functions shown in FIG. 2 are implemented by loading given software onto the CPU 101 or the main storage unit 102, making the communication control unit 104, the input device 105, the output device 106 and the like operate under control of the CPU

101, and performing reading and writing of data in the main storage unit 102 or the auxiliary storage unit 103. The data and database required for processing are stored in the main storage unit 102 or the auxiliary storage unit 103.

Note that, although the content server 10 is composed of one computer in FIG. 3, the functions of the content server 10 may be distributed among a plurality of computers. For example, the content server 10 may be composed of a computer having a database function (the address storage unit 11 and the content storage unit 13) and a computer having the other functions.

Referring back to FIG. 2, the address storage unit 11 is a means of storing address information that includes location regions of registered users which have been set based on addresses of the registered users and IP addresses which have been respectively assigned to terminals of the registered users in association with each other. The "registered user" in this specification is a user whose address is known, which is a known user, and it is not limited to a user who is registered as a member of a website.

FIGS. 4 and 5 show examples of the address information stored in the address storage unit 11. The address information shown in FIG. 4 is information including user IDs that uniquely identify registered users, IP addresses respectively assigned to terminals of registered users, and location regions of registered users in association with one another. The address information shown in FIG. 5 is information including IP addresses of terminals of registered users and location regions of registered users in association with each another without including user IDs. In this manner, the address information is information that at least includes IP addresses and location regions of registered users.

The address information storing unit 12 is a means of generating address information and storing it into the address storage unit 11.

For example, the address information storing unit 12 generates the address information shown in FIG. 4 or 5 from member information on a specified website (for example, a website implemented by the content server 10) and stores the address information into the address storage unit 11. The member information is information related to users registered as members of the website and input through a web page at the time of member registration on the website. As shown in FIG. 6, the member information contains user IDs, IP addresses, and addresses of users registered at the time of member registration.

The address information storing unit 12 sorts addresses of users into certain wide ranges such as cities and towns or districts, for example, and sets them as location regions. For example, the address information storing unit 12 sorts individual addresses such as "1-chome, X-cho, Sakai-shi, Osaka" and "3-chome, Y-cho, Sakai-shi, Osaka" into the location region "Sakai-shi, Osaka". Then, the address information storing unit 12 sorts member information in ascending or descending order of IP addresses and then groups them into blocks indicating specified address ranges. A method of setting the blocks is not particularly limited. For example, the address information storing unit 12 may set a block for each range of IP addresses managed by one DHCP server or may set a block for each range where IP addresses are substantially consecutive. FIGS. 4 and 5 show three blocks indicated by block information "blocks A, B, C".

In the case of storing the address information shown in FIG. 5 (the address information with no user IDs), the address information storing unit 12 may use a large amount of input information accepted on a specified website (for example, a website implemented by the content server 10).

The input information is information that has been input through a web page by users who have accessed the website for procedures such as purchasing an item or booking a hotel, and it may be information of users who are not members of the website. As shown in FIG. 7, the input information includes IP addresses extracted from request signals from user terminals and input addresses of users. The address information storing unit 12 generates the address information from the large amount of accumulated input information and stores the address information into the address storage unit 11, in the same manner as when generating the address information from the member information.

The reason for setting a range (block) of IP addresses of each region from information of each IP address as described above is that there are many providers that assign a group of consecutive IP addresses to each region (for example, each prefecture). For example, a telecommunications carrier for which inter-prefectural communications are restricted by law employs an architecture that constructs an IP network for each prefecture and makes a connection to a provider, and therefore IP addresses are prepared for each prefecture when viewed from the provider. Thus, such as provider installs a DHCP server that assigns IP addresses to user terminals for each specified region and prepares IP addresses within a specified range for each DHCP server. This allows association between a region and a range (block) of IP addresses. Note that a user terminal may access a provider by any ways, and a user terminal may access a provider through FTTH, wireless LAN (for example, Wi-Fi), ADSL or the like, for example.

In this manner, by generating the address information from IP addresses of terminals of the registered users who have accessed to a web page and addresses of the registered users that have been input on the web page, it is possible to collect a large amount of address information efficiently. It is only required to know IP addresses and addresses to generate the address information, and personal information (for example, names and birth dates) other than addresses are not required.

The content storage unit 13 is a means of storing region information indicating geographical regions and content data to be delivered to each region in association with each other. As shown in FIG. 8, the content storage unit 13 stores content data "content A" to be delivered to user terminals T in Hokkaido, content data "content B" to be delivered to user terminals T in Saitama and the like.

Although the region information in the example of FIG. 8 indicates the geographical range that includes a location region defined in the address information, setting of the region information is not limited thereto. For example, the region information indicating a location region itself may be associated with content data. Further, although the region information is prefectures in FIG. 6, the region information indicating countries or cities and towns may be used.

Examples of contents stored in the content storage unit 13 include the content that forms a part of a specified web page (for example, a content indicating the weather of an area, an advertisement for a specific area etc.), one whole web page (for example, a portal page set for each country) and the like. The details of the content may be determined arbitrarily.

The receiving unit 14 is a means of receiving a request signal indicating a request for content from the user terminal T. The receiving unit 14 outputs the request signal to the acquisition unit 15. The user terminal T is a terminal of a user whose address is unknown (for example, a user who is not a member of a website or a user who accesses a website for the first time), and therefore the address information about the IP address of the user terminal T and the user of the user terminal T does not exist.

The acquisition unit 15 is a means of analyzing the input request signal and thereby acquiring an IP address assigned to the user terminal T that has transmitted to the signal, which is a request source terminal. The acquisition unit 15 outputs the acquired IP address to the determination unit 16.

The determination unit 16 is a means of determining the location region of a user (which is also referred to hereinafter as "request user") of the request source terminal by referring to the address storage unit 11 based on the input IP address. Specifically, the determination unit 16 compares the input IP address with the address range corresponding to each block in the address storage unit 11 and thereby identifies a block where the input IP address is included. Then, the determination unit 16 sets the location region (most frequent location region) where the number of appearances is the largest within the specified block as a location region of the block and determines that the request user corresponding to the input IP address is present in that location region. The determination unit 16 then outputs the location region as a determination result to the transmitting unit 17.

For example, when the input IP address is "xxxx.xxxx-.aaaa.104", the determination unit 16 identifies "block A" from the address information shown in FIG. 4 or 5. Then, when the most frequent location region of the "block A" is "A-ku, Sapporo-shi, Hokkaido", the determination unit 16 determines the location region of the request user as "A-ku, Sapporo-shi, Hokkaido".

The transmitting unit 17 is a means of reading content data corresponding to the location region determined by the determination unit 16 from the content storage unit 13 and transmitting it to the request source terminal. The transmitting unit 17 specifies the region information corresponding to the location region of the request user indicated by the input determination result from the content storage unit 13. Then, the transmitting unit 17 reads the content data corresponding to the specified region information from the content storage unit 13 and transmits the content data to the user terminal T that has transmitted the request signal. Assuming that the content data is prepared as shown in FIG. 8, when the location region is "Sakai-shi, Osaka", for example, the transmitting unit 17 specifies the region information "Osaka" and transmits the content data "content C".

Figure 9:
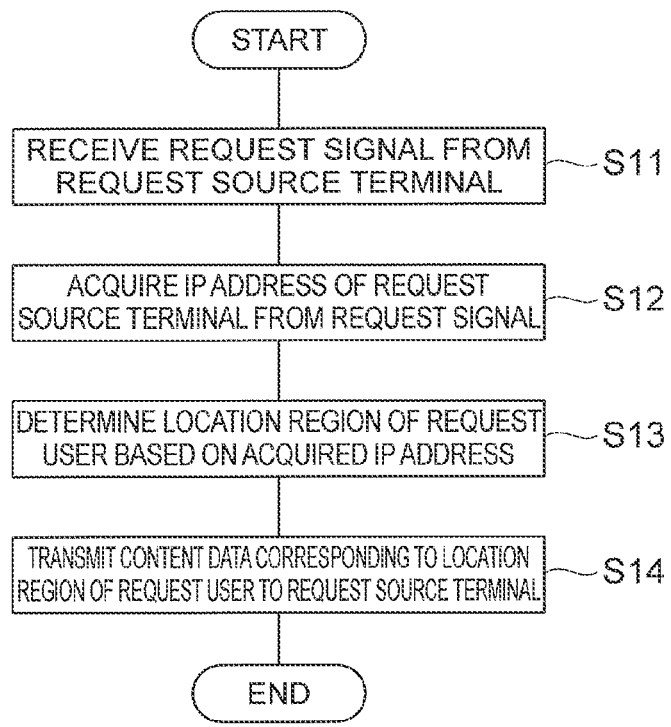
FIG. 9 is a flowchart showing an operation of the content server shown in FIG. 1.

Hereinafter, the operation of the content server 10 shown in FIG. 1 is described and further a region identification method and a content providing method according to this embodiment are described with reference to FIG. 9. A series of processing steps are described hereinafter on the assumption that the address information is stored in the address storage unit 11 as shown in FIG. 4 or 5 and the content data is stored in the content storage unit 13 as shown in FIG. 8.

When a request signal is transmitted from a certain user terminal T (request source terminal), the receiving unit 14 receives the signal (Step S11, receiving step), and the acquisition unit 15 acquires the IP address of the request source terminal from the signal (Step S12, acquisition step). Then, the determination unit 16 refers to the address storage unit 11 based on the IP address and thereby determines the location region of the request user (Step S13, determination step). Then, the transmitting unit 17 reads the content data corresponding to the location region of the request user from the content storage unit 13 and transmits it to the request source terminal (Step S14). The request user can thereby view the content related to the location region.

Figure 10:
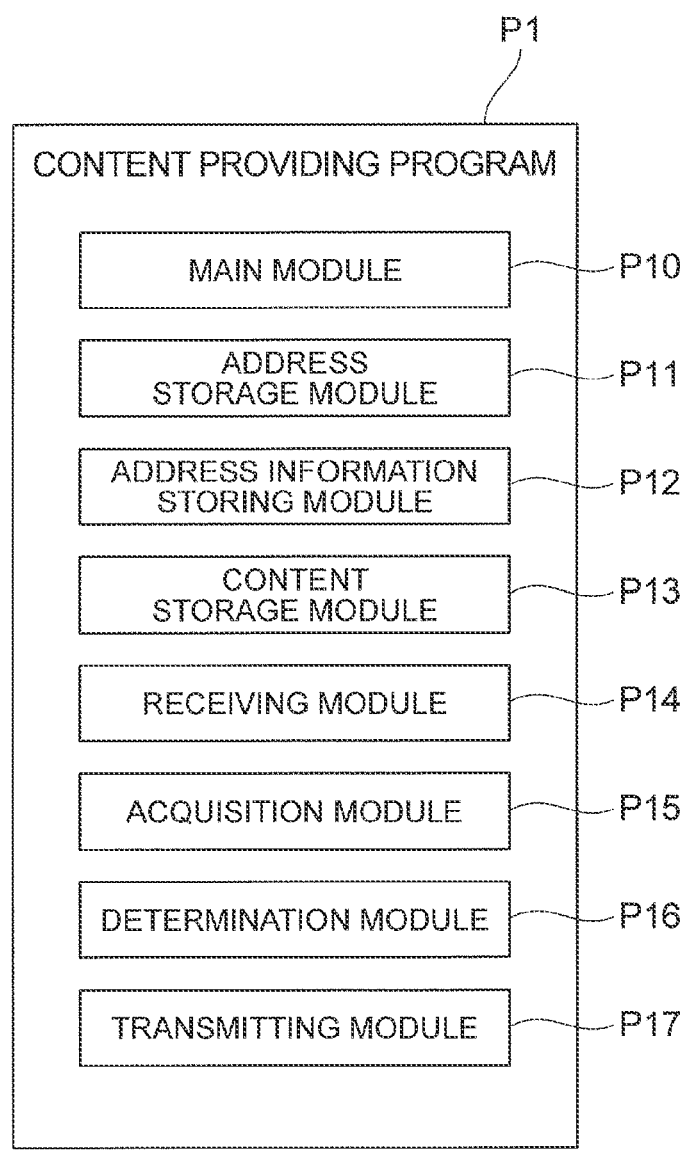
FIG. 10 is a diagram showing a configuration of a content providing program according to an embodiment.

A content providing program (region identification program) that causes a computer to function as the content server 10 is described hereinafter with reference to FIG. 10.

A content providing program P1 includes a main module P10, an address storage module P11, an address information storing module P12, a content storage module P13, a receiving module P14, an acquisition module P15, a determination module P16, and a transmitting module P17.

The main module P10 is a part that exercises control over the region identification function and the content providing function. The functions implemented by the address storage module P11, the address information storing module P12, the content storage module P13, the receiving module P14, the acquisition module P15, the determination module P16 and the transmitting module P17 are respectively the same as the functions of the address storage unit 11, the address information storing unit 12, the content storage unit 13, the receiving unit 14, the acquisition unit 15, the determination unit 16 and the transmitting unit 17.

The content providing program P1 is provided in the form of being recorded on a recording medium such as CD-ROM or DVD-ROM, or semiconductor memory, for example. Further, the content providing program P1 may be provided as a computer data signal superimposed on a carrier wave through a communication network.

As described above, according to this embodiment, the address information in which location regions based on addresses of registered users (known users) and IP addresses of terminals of the registered users are associated with each other are prepared in advance. Then, when a request signal is transmitted from a request source terminal that requests a content, the IP address of the request source terminal is acquired from the request signal, and the location region of a user (unknown user) of the terminal is determined based on the IP address and the address information. In this manner, by preparing the address information using addresses of registered users and determining the location region of the user of the terminal based on the IP address of the request source terminal and the address information, it is possible to easily identify the location region of an unknown user.

In this embodiment, the address information is grouped based on the concept of blocks, and the most frequent location region in each block is set as the location region of the block. Then, the location region of the block where the IP address of the request source terminal is included is determined as the location region of the request user. Thus, even when a plurality of location regions exist in one block, it is possible to determine the location region of an unknown user accurately with high probability.

Further, in this embodiment, the content data for the determined location region is transmitted to the request source terminal, and therefore it is possible to provide the content in accordance with the location region of an unknown user.

Hereinbefore, the present invention has been described in detail with respect to embodiments thereof. However, the present invention is not limited to the above-described embodiments. Various changes and modifications may be made therein without departing from the scope of the invention.

A method of determining the location region of a request user is not limited to the example of the above embodiment, and the following method may be used.

Specifically, the address storage unit 11 is configured as shown in FIG. 11, and the address information is grouped not only by blocks but also by sub-blocks. A method of setting the blocks is the same as described in the above embodiment. On the other hand, the sub-blocks are the concept for further grouping the address information in one block. Specifically, based on the assumption that IP addresses are sorted in ascending or descending order, a plurality of address information whose location region is the same and which are arranged consecutively in one block are grouped together as a sub-block.

In the example of FIG. 11, in the block B, the four address information whose location region is "Kawaguchi-shi, Saitama" and which are arranged consecutively (the least significant bit of IP addresses are 50 to 53) are grouped together as a sub-block B1. Further, the four address information whose location region is "Saitama-shi, Saitama" and which are arranged consecutively (the least significant bit of IP addresses are 54 to 60) are grouped together as a sub-block B2.

In this case, the determination unit 16 compares the input IP address with the address range corresponding to each sub-block in the address storage unit 11 and thereby identifies the sub-block where the input IP address is included. Then, the determination unit 16 determines that the location region corresponding to the identified sub-block is the location region of a request user. For example, when the input IP address is "xxxx.xxxx.bbbb.56", the determination unit 16 identifies "sub-block B2" based on the address information shown in FIG. 11. The determination unit 16 then determines that the location region of the request user is "Saitama-shi, Saitama". In this manner, it is possible to accurately determine the location region of the request user.

Although the address information includes user IDs in the example of FIG. 11, the user IDs may be omitted just like the example of FIG. 5.

The address storage unit 11 and the content storage unit 13 may be placed on a server different from the content server 10. In this case, the content server 10 may access each storage unit through the communication network N. Further, the address information storing unit 12 may be placed on a server different from the content server 10.

Although the region identification server according to one embodiment of the present invention is applied to the content server 10 in the above-described embodiment, the region identification server may be used for purposes other than content delivery. For example, the region identification server may be used for accumulating data of the determined location regions of users. In this case, the function of transmitting content data to a request source terminal may be omitted.

REFERENCE SIGNS LIST

10 . . . content server, 11 . . . address storage unit, 12 . . . address information storing unit, 13 . . . content storage unit, 14 . . . receiving unit, 15 . . . acquisition unit, 16 . . . determination unit, 17 . . . transmitting unit, P1 . . . content providing program, P10 . . . main module, P11 . . . address storage module, P12 . . . address information storing module, P13 . . . content storage module, P14 . . . receiving module, P15 . . . acquisition module, P16 . . . determination module, P17 . . . transmitting module, T . . . user terminal

The invention claimed is:

1. A region identification server configured with a processor comprising:
at least one memory operable to store computer program instructions;
at least one processor operable to read said computer program instructions and operate according to said program instructions, said program instructions including:
receiver instructions configured to cause said at least one processor to receive a request signal from a request source terminal whose address is unknown;
acquisitor instructions configured to cause said at least one processor to acquire an IP address assigned to the request source terminal from the request signal received by the receiver instructions; and
determinator instructions configured to cause said at least one processor to determine a location region of a user of the request source terminal by referring to an address storage based on the IP address acquired by the acquisitor instructions, the location region corresponding to a specified address range, the address storage storing address information including location regions of registered users set based on addresses of the registered users and IP addresses assigned to terminals of the registered users in association with each other,
wherein the address information stored in the address storage are arranged in ascending or descending order of IP addresses and grouped in advance into blocks indicating specified address ranges,
in each block, a plurality of address information with the same location region and arranged consecutively are grouped together in advance as a sub-block by storing the location region and the sub-block in association with each other in the address storage, and
the determinator instructions configured to cause said at least one processor to determine a location region corresponding to the sub-block including the acquired IP address as the location region of the user of the request source terminal.

2. The region identification server according to claim 1, wherein
the address information stored in the address storage are arranged in ascending or descending order of IP addresses and grouped into blocks indicating specified address ranges, and, in each block, a location region with the largest number of appearances is set as a location region of the block, and
the determinator instructions configured to cause said at least one processor to determine a location region corresponding to the block including the acquired IP address as the location region of the user of the request source terminal.

3. The region identification server according to claim 1, wherein
the address information is information generated based on IP addresses of terminals contained in request signals received from the terminals of the registered users and addresses of the registered users input on a web page corresponding to the request signals.

4. The region identification server according to claim 1, further comprising:
transmitter instructions configured to cause said at least one processor to read content data corresponding to the location region determined by the determinator instructions from a content storage that stores region information indicating geographical regions and content data to be delivered to each region in association with each other, and to transmit the read content data to the request source terminal.

5. The region identification server according to claim 1, wherein
the determinator instructions are configured to cause said at least one processor to compare the acquired IP address with an address range corresponding to the sub-block to identify the sub-block where the acquired IP address is included.

6. The region identification server according to claim 1, wherein,
when each block is divided into sub-blocks, a plurality of address information having common region information are grouped together as a sub-block, each piece of region information being included in the location region of the address information stored in the address storage unit.

7. The region identification server according to claim 6, wherein
the common region information is set as a location region of the sub-block, which is a determination result, and
the determinator instructions are configured to cause said at least one processor to determine the location region corresponding to the sub-block including the acquired IP address as the location region of the user of the request source terminal.

8. The region identification server according to claim 1, wherein each of the IP addresses of the registered users is an unique IP address assigned to each of the registered users by an IP address provider.

9. A region identification method executed by a region identification server, comprising:
receiving a request signal from a request source terminal whose address is unknown;
acquiring an IP address assigned to the request source terminal from the request signal received; and
determining a location region of a user of the request source terminal by referring to an address storage unit based on the IP address acquired, the location region corresponding to a specified address range, the address storage unit storing address information including location regions of registered users set based on addresses of the registered users and IP addresses assigned to terminals of the registered users in association with each other,
wherein the address information stored in the address storage are arranged in ascending or descending order of IP addresses and grouped in advance into blocks indicating specified address ranges,
in each block, a plurality of address information with the same location region and arranged consecutively are grouped together in advance as a sub-block by storing the location region and the sub-block in association with each other in the address storage, and
the determinator instructions configured to cause said at least one processor to determine a location region corresponding to the sub-block including the acquired IP address as the location region of the user of the request source terminal.

10. A non-transitory computer readable recording medium storing a region identification program causing a computer to:
receive a request signal from a request source terminal whose address is unknown;
acquire an IP address assigned to the request source terminal from the received request signal; and
determine a location region of a user of the request source terminal by referring to an address storage based on the acquired IP address, the location region corresponding to a specified address range, the address storage storing address information including location regions of registered users set based on addresses of the registered users and IP addresses assigned to terminals of the registered users in association with each other,
wherein the address information stored in the address storage are arranged in ascending or descending order of IP addresses and grouped in advance into blocks indicating specified address ranges,
in each block, a plurality of address information with the same location region and arranged consecutively are grouped together in advance as a sub-block by storing the location region and the sub-block in association with each other in the address storage, and
the determinator instructions configured to cause at least one processor to determine a location region corresponding to the sub-block including the acquired IP address as the location region of the user of the request source terminal.

* * * * *